April 5, 1932. J. A. SPENCER 1,852,543
THERMOSTATIC DEVICE AND METHOD OF MAKING THE SAME
Original Filed April 27, 1923
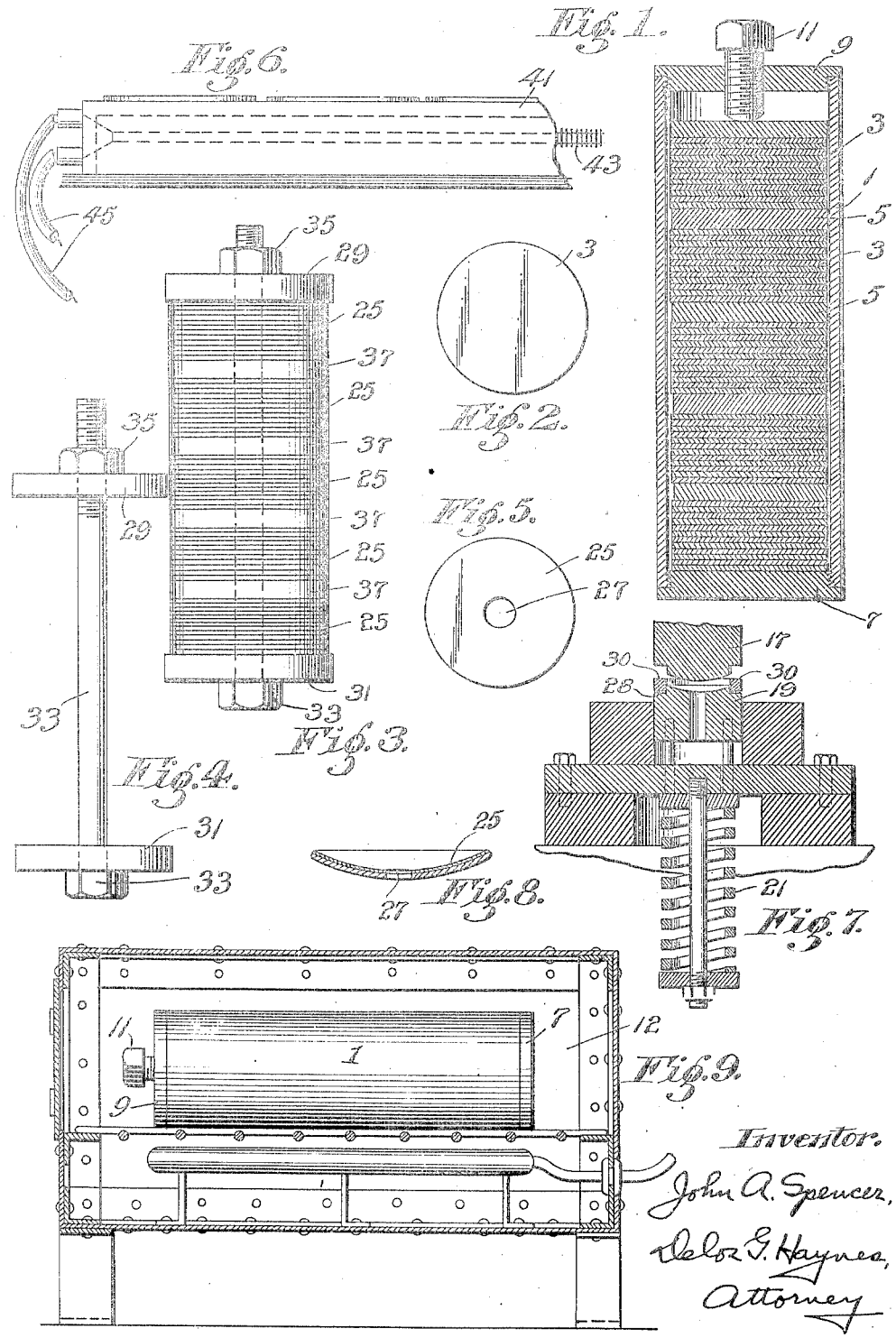
Inventor.
John A. Spencer,
Delos G. Haynes,
Attorney Patented Apr. 5, 1932

1,852,543

UNITED STATES PATENT OFFICE

JOHN A. SPENCER, OF NEWTON, MASSACHUSETTS, ASSIGNOR TO SPENCER THERMOSTAT COMPANY, OF CAMBRIDGE, MASSACHUSETTS, A CORPORATION OF MASSACHUSETTS

THERMOSTATIC DEVICE AND METHOD OF MAKING THE SAME

Application filed April 27, 1923, Serial No. 635,150. Renewed April 19, 1930.

This invention relates to thermostatic materials, and with regard to certain more specific features, to the heat treatment of thermostatic metal.

Among the several objects of the invention may be noted the provision of an inexpensive thermostatic device of improved durability and accuracy, the provision of a simple and effective method of treating thermostatic materials; and the provision of a readily controlled treatment for thermostatic metal for improving certain of the characteristics of the metal. Other objects will be in part obvious and in part pointed out hereinafter.

The invention accordingly consists of the elements and combinations of elements, steps and sequence of steps, features of construction and arrangements of parts, which are exemplified in the accompanying drawings, and the scope of the application of which will be pointed out in the appended claims.

In the accompanying drawings, in which are illustrated two or more of various possible embodiments of the invention, Fig. 1 is a sectional elevation of a clamp, showing thermostatic devices therein;

Fig. 2 is a face view of a thermostatic device;

Fig. 3 is an elevation of a modified clamp showing thermostatic devices and spacers therein;

Fig. 4 is an elevation of the clamp of Fig. 3, without the devices and spacers.

Fig. 5 is a face view of the thermostatic device illustrated in Fig. 3..

Fig. 6 is an elevation of a heater.

Fig. 7 is a sectional elevation of a press and die;

Fig. 8 is a sectional elevation of the thermostatic device of Fig. 5, after the thermostatic device has been formed or shaped in the die shown in Fig. 7; and Fig. 9 is a sectional elevation of an oven, with the clamp of Fig. 1 therein.

Similar reference characters indicate corresponding parts throughout the several views of the drawings.

In the use of thermostatic materials, including those shown and claimed in my Patent No. 1,448,240 dated March 13, 1923, there has been difficulty in accurately predetermining the critical temperatures at which the thermostatic device will operate; there has been difficulty in producing thermostatic metal that will stand high temperatures; and certain objectionable progressive changes in operating characteristics have been noted, making the thermostatic device unsuited for long and continued use without recalibration. The present invention relates to reduction or elimination of these several troubles.

The term composite or thermostatic metal or material is used herein to indicate a plurality of metals or other materials of unequal thermal coefficients of expansion, so united to one another that upon a change of temperature there is a tendency of the device to change its shape due to the unequal expansion (or contraction, as the case may be) of the components.

The invention will be described and illustrated in connection with composite metallic devices of disc-like form, adapted to be so shaped that upon reaching a critical temperature during heating and/or cooling, the device will suddenly alter its shape, or tend to do so. It will be understood, however, that the invention is not limited to devices of this type, or to metallic devices.

Each of the three steps herein set forth produces advantageous results upon the thermostatic devices. Each step may be used alone, or in combination with either or both of the other steps.

Many of the advantageous results obtained in the steps and sequence of steps herein described and illustrated would attend the use of said steps or sequence of steps with composite or thermostatic materials generally; and the same is true of the use of the apparatus herein shown and described.

Referring now to the accompanying drawings, there is illustrated in Fig. 1 a clamp comprising a cylinder 1 adapted to receive a series of discs 3 (Fig. 2) separated by spacers 5 and maintained in suitable contour or position (flat, in this instance) by said spacers in connection with the removable base 7 of the cylinder and the removable top 9 and the clamping screw and bolt 11, the tightness of which may be adjusted manually.

The devices that are put into this clamp are discs cut from composite or thermostatic sheet material, such as thermostatic metal composed of monel and invar. These discs are ordinarily fairly flat at room temperature, but not necessarily so. The discs are put into the clamp shown in Fig. 1, and suitable pressure is brought thereon by means of the adjustable bolt 11. Then the clamp is put into an oven 12 (Fig. 9) or otherwise heated for a suitable length of time and at a suitable temperature. Preferably the temperature is of the magnitude of 450 degrees C. and the time of treatment is of the magnitude of one hour. The time and temperature of treatment vary considerably, depending upon factors such as the working temperature range that is expected of the device after it is finished. With a higher temperature (provided the temperature is not excessive for the type of material used) a shorter time is required, and with a lower temperature a longer time.

When the discs are released from the clamp, the discs are concave on the side of the metal having the higher thermal coefficient of expansion, when the discs are at room temperature. This means that a deformation has occurred, because prior to the treatment the discs were substantially flat at room temperature.

I find that after this treatment the discs are more uniform in their operating characteristics, the critical temperatures at which the discs operate can be predetermined more accurately, the critical temperatures can be higher than before without objectionable inaccuracies and/or fatigue being encountered, and the treatment appears to do no harm to the material of which the discs are composed.

The time and temperature of the treatment should preferably be sufficient to cause the discs to have a definite concavity on the side of higher thermal coefficient of expansion. The temperature should not be high enough to change the quality of other characteristics of the discs.

If discs of the type shown at 25 in Fig. 5 are used, the central aperture 27 therein may be made use of in order to aline the discs in the clamp. For this purpose a clamp of the type shown in Figs. 3 and 4 may be used. In the latter figures the clamp comprises an upper plate 29, a lower plate 31, a bolt 33, extending through central apertures in the plate, and a nut 35 adjustable manually for exerting the desired amount of pressure upon the disc 25 and spacers 37 mounted between the plates. Here, as in Fig. 1, the discs are maintained in suitable contour or position (flat, in this instance) by said spacers in connection with the two plates.

After the discs have been put through this heat treatment, which may be referred to for convenience as the first step, they are formed or shaped in a press such as the one illustrated in Fig. 7. In this press an upper die 17 is forced down upon a lower die 19, which is cushioned upon a spring 21, and the disc, which is inserted between the two dies, is thereby given a contour of the general type shown in Fig. 8. Washers 28 may be inserted beneath the ring 30 to limit the movement of the upper die toward the lower die to the desired extent and thereby to vary the contour of the completed disc.

During the forming or shaping step or operation, the discs are preferably at a temperature above the temperature at which they are to be used. Discs for use at high temperatures such as about 300 degrees C. are preferably formed at a temperature of fifty to one hundred degrees C. above that figure. This temperature may vary considerably, depending upon the normal working range of temperatures of the finished disc. In order to heat the discs that are ready for the forming operation, the discs may be placed upon a hot plate such as the plate illustrated at 41 in Fig. 6, wherein the heater unit 43 is supplied with current from suitable terminals 45.

After the device has been formed or shaped, it is preferably heated on a hot plate of the type shown in Fig. 6, or in an oven, to improve the device. This treatment is preferably made while the device is in the hot position, that is, concave on the side having the lower thermal coefficient of expansion. This is the position that the device when completed normally takes when heated to a point above the critical temperature.

Ordinarily the device is forced to the hot position for the purpose of this heat treatment. This saves time and makes it unnecessary to use a temperature that might be detrimental to the device.

Thermostatic material intended for use at around 300 degrees C. with a normal working range of say 200 to 300 degrees C. is subjected to a temperature of around 350 to 400 degrees C. in this step of the treatment thus subjecting the material to shape-changing stresses greater than those encountered during normal operation. By shape-changing stresses is meant stresses tending to cause change of shape of the thermostatic material. The time of treatment may be ten minutes to half an hour or so. A higher temperature requires a shorter time, and a lower temperature a longer time. The temperature is preferably above the normal working range of the material.

The temperatures used in connection with the present invention vary with the materials of which the thermostatic devices are composed. The temperatures need not be and preferably are not high enough to anneal the materials or otherwise to affect them deleteriously.

In view of the above, it will be seen that the objects of the invention are achieved and other advantageous results obtained.

It will be understood that many changes may be made in the above described embodiments of the invention without departing from the spirit or scope of this invention.

I claim:

1. A thermostatic device comprising bimetallic thermostatic material which has been heated while clamped to restrain or prevent change of shape thereof upon change of temperature, the heating and restraining being sufficient to deform the device and to cause the device to assume a different shape at a given temperature than before.

2. A thermostatic device comprising bimetallic thermostatic material which has been formed or shaped so that the device will change its shape suddenly upon reaching a predetermined temperature; the device having been thereafter heated as a step in the manufacture thereof, while in the hot position, to a temperature above the normal working range of the device.

3. A thermostatic device comprising bimetallic thermostatic material which has been heated while clamped to restrain or prevent change of shape thereof upon change of temperature, said device having been thereafter formed or shaped so that the device will change its shape suddenly upon reaching a predetermined temperature.

4. A thermostatic device comprising bimetallic thermostatic material which has been heated while clamped to restrain or prevent change of shape thereof upon change of temperature, said device having been thereafter formed or shaped at a temperature above the normal working range of the device, so that the device will change its shape suddenly upon reaching a predetermined temperature the temperature in each case not being high enough to anneal the metallic components of said device.

5. A thermostatic device comprising bimetallic thermostatic material which has been heated while clamped to restrain or prevent change of shape thereof upon change of temperature, said device having been thereafter formed or shaped so that the device will change its shape suddenly upon reaching a predetermined temperature; the device having been thereafter heated, while in the hot position, to a temperature above the normal working range of the device but not high enough to anneal the metallic components thereof.

6. The method of treating a bimetallic thermostatic device, which comprises clamping said device to restrain or prevent change of shape thereof upon change of temperature while heating said device to a temperature above its normal working range, and forming or shaping the device while heated to a temperature substantially above the normal working range of the device.

7. The method of treating a bimetallic thermostatic device, which comprises forming or shaping the device while heated to a temperature substantially above the normal working range of the device, forcing the device to the hot position, and heating the device to a temperature above the normal working range of the device the temperature in each case not being high enough to anneal the metallic components thereof.

8. The method of treating a bimetallic thermostatic device, which comprises clamping said device to restrain or prevent change of shape thereof upon change of temperature while heating said device to a temperature above its normal working range, to cause the device to be deformed, to reduce or eliminate inequalities of stresses in the device due to rolling, whereby the device after such treatment assumes a different shape at a given temperature, than before; forming or shaping the device while heated to a temperature substantially above the normal working range of the device, so that the device will change its shape suddenly upon reaching a predetermined temperature; forcing the device to the hot position, and heating the device to a temperature above the normal working range of the device, to reduce inequalities of stresses in the device the temperature in each case not being high enough to anneal the metallic components thereof.

9. The method of treating a bimetallic thermostatic device, which comprises forming or shaping the device while heated to a temperature substantially above the normal working range of the device, heating and forcing the device to the hot position, and heating the device to a temperature above the normal working range of the device.

10. A thermostat comprising composite thermostatic material and means for confining at least a portion of said material against free expansion, thereby setting up internal stresses the magnitude of which changes upon change of temperature, the thermostat reaching a condition of instability when it is cooled to a predetermined temperature, the material then abruptly changing its shape due to release of internal stresses theretofore stored up in the material, said thermostat having been heat treated while restrained from changing shape at a temperature above its normal working range whereby the range within which said thermostat is adapted to operate remains substantially constant.

11. A thermostat comprising a sheet of composite thermostatic material, at least a portion of which is confined against free change of shape, thereby setting up internal stresses the magnitude of which change upon change of temperature, the thermostat being so shaped that change of its shape is a discontinuous function of the temperature, said thermostat having been shaped and heat treated at a temperature above the normal working range whereby internal stresses are relieved and the temperature range within which said thermostat is adapted to operate remains substantially constant.

12. A thermostatic device comprising bimetallic thermostatic material which has been formed or shaped at a temperature above the normal working range of the device, so that the device will change its shape suddenly upon reaching a predetermined temperature, the device having been thereafter heated, while in the hot position, to a temperature above the normal working range of the device, as a step in the manufacture thereof.

13. The method of treating bimetallic thermostatic materials, which comprises clamping a thermostatic device to restrain or prevent change of shape thereof upon change of temperature, and heating said device to a temperature above its normal working range, to deform the device, as a step in the manufacture thereof.

14. Composite thermostatic material which has been heated to a predetermined temperature while clamped to restrain change of shape, whereby said material has been subjected to shape-changing stresses substantially greater than those encountered during normal operation.

15. The method of manufacturing composite thermostatic material, which comprises subjecting the material to predetermined heating at a temperature substantially above the normal working temperatures of the material, while restraining the material against change of shape, forcibly changing the shape of the material in the direction that the material takes upon increase of temperature, and subjecting the material while in such position to predetermined heating at a temperature substantially above the normal working range of the material.

16. The method of manufacturing high-temperature thermostatic devices which comprises forcibly changing the shape of the device in the direction that the device takes upon increase of temperature, and subjecting the device to predetermined heating while in such position.

17. The method of treating composite thermostatic material, which comprises securing the material to restrain change of shape thereof, and heating to a predetermined extent the material while thus secured, thereby subjecting the material to shape-changing stresses substantially greater than those encountered during normal operation.

18. The method of treating high-temperature composite thermostatic material to reduce fatigue therein, said method comprising forming the material in a composite thermostatic sheet, cutting the blank therefrom, and thereafter clamping the blank to restrain change of shape thereof, and subjecting the blank, while thus clamped, to predetermined heating at a temperature substantially greater than the temperatures encountered during normal operation.

19. A high-temperature thermostat having constant operating characteristics, said thermostat including composite thermostatic material cut from a composite thermostatic sheet and thereafter subjected to predetermined temperature substantially higher than the normal working range of the material.

20. A high-temperature thermostat having constant operating characteristics, said thermostat including composite thermostatic material cut from a composite thermostatic sheet and thereafter subjected to substantial heating, thereby producing in the material shape-changing stresses substantially greater than those encountered during normal operation.

21. A thermostatic device consisting of a piece of composite thermostatic material which has been cut from a sheet and as a final step in its manufacture subjected to predetermined heating producing in the material stresses substantially greater than those encountered in normal operation.

22. The method of manufacturing thermostatic devices, which comprises cutting a piece of composite thermostatic material to form the device, and thereafter subjecting the material to predetermined heating substantially greater than that encountered in normal operation.

23. The method of manufacturing thermostats, which comprises cutting the thermostat from a composite thermostatic sheet, heating the thermostat, forming the thermostat to the desired curvature, and thereafter heating the thermostat.

24. The method of manufacturing thermostats, which comprises cutting the thermostat from a composite thermostatic sheet, heating the thermostat, forcing the thermostat to the hot position, and heating the thermostat while in such position.

25. The method of manufacturing thermostats, which comprises cutting the thermostat from a composite thermostatic sheet, securing the thermostat to restrain change of shape thereof, heating the thermostat while thus secured, forming the thermostat to the desired curvature while heated, forcing the thermostat to the hot position, and heating the thermostat while in such position.

26. The method of manufacturing thermostats, which comprises cutting the thermostat from a composite thermostatic sheet, heating the thermostat, forming the thermostat to the desired curvature while heated, and thereafter subjecting the thermostat to a temperature higher than the temperatures encountered in the normal operation of the thermostat.

27. A thermostatic device comprising bimetallic thermostatic material which has been formed or shaped so that it will change its shape suddenly upon reaching a predetermined temperature, the device having been thereafter heated to a temperature above the normal working range of the device, as a step in the manufacture thereof.

28. A thermostatic device comprising bimetallic thermostatic material cut from a bimetallic thermostatic sheet, the device having been heated above the normal working range of the device, then formed or shaped so that it will change its shape suddenly upon reaching a predetermined temperature, the device having been thereafter reheated to a temperature above the normal working range of the device, as a step in the manufacture thereof.

29. A thermostatic device comprising bimetallic thermostatic material cut from a bimetallic thermostatic sheet, the device having been heated above the normal working range of the device while clamped to restrain or prevent change of shape thereof upon change of temperature, then formed or shaped so that it will change its shape suddenly upon reaching a predetermined temperature, the device having been thereafter reheated to a temperature above the normal working range of the device, as a step in the manufacture thereof.

30. In the manufacture of a thermostatic device comprising bimetallic thermostatic material, the steps which comprise blanking the device from a bimetallic sheet, clamping the blanked device to restrain or prevent change of shape thereof upon change of temperature, heating the device while clamped above the normal working range thereof, forming or shaping the thus heat-treated device so that it will change its shape suddenly upon reaching a predetermined temperature, and then reheating the formed device to a temperature above its normal working range.

31. In the manufacture of a thermostatic device comprising bimetallic thermostatic material, the steps which comprise blanking the device from a bimetallic sheet, heating the blanked device above its normal working range, then forming or shaping the thus heat-treated device while still hot so that it will change its shape suddenly upon reaching a predetermined temperature, and then reheating the formed device to a temperature above its normal working range.

32. In the manufacture of a thermostatic device comprising bimetallic thermostatic material, the steps which comprise blanking the device from a bimetallic sheet, clamping the blanked device to restrain or prevent change of shape thereof upon change of temperature, heating the device while clamped above its normal working range, forming or shaping the thus heat-treated device so that it will change its shape suddenly upon reaching a predetermined temperature, and then reheating the formed device while it is in the hot position to a temperature above the normal working range of the device.

33. As a new article of manufacture, a thermostatic element adapted for high temperature uses and having constant operating characteristics, the said element having been cut from a sheet of thermostatic material comprising at least two metals of different coefficients of expansion and integrally united, the said thermostatic material having been thereafter subjected to predetermined temperature substantially higher than the normal working range of the material, to relieve fatigue normally present therein, and to produce in the material shape-changing stresses substantially greater than those encountered during normal operation.

In testimony whereof, I have signed my name to this specification this 10th day of April, 1923.

JOHN A. SPENCER.